United States Patent [19]
Trotta et al.

[11] Patent Number: 5,051,591
[45] Date of Patent: Sep. 24, 1991

[54] REFLECTIVE CHOPPER FOR INFRARED IMAGING SYSTEMS

[75] Inventors: Patrick A. Trotta, Plano; Samuel R. McKenney, Dallas, both of Tex.

[73] Assignee: Texas Instruments Incorporated, Dallas, Tex.

[21] Appl. No.: 639,401

[22] Filed: Jan. 10, 1991

Related U.S. Application Data

[63] Continuation of Ser. No. 387,456, Jul. 28, 1989, abandoned.

[51] Int. Cl.⁵ ............................................. G01J 5/08
[52] U.S. Cl. ..................................... 250/351; 250/330; 250/332; 250/334; 250/342; 250/347; 250/350
[58] Field of Search ............... 250/350, 351, 347, 342, 250/334, 332, 330

[56] References Cited

U.S. PATENT DOCUMENTS 4,158,136  6/1979  Felix et al. ........................ 250/330
4,227,210  10/1980  Nixon ................................ 358/113
4,965,447  10/1990  Bly et al. ........................... 250/233

FOREIGN PATENT DOCUMENTS 2731654  3/1977  Fed. Rep. of Germany .
2083967  3/1982  United Kingdom .
2187060  8/1987  United Kingdom .

Primary Examiner—Constantine Hannaher
Attorney, Agent, or Firm—René E. Grossman; Melvin Sharp

[57] ABSTRACT

A chopper, in an infrared imaging system, is used to scatter infrared radiation from a viewed scene. This scattered radiation is detected with an infrared detector and used to produce a reference signal, which represents the uniform average radiance of the scene. This reference signal may be substracted from a signal representing the unscattered radiation emitted by the scene, to produce a signal that represents only radiance differences and that is an optimal signal for amplification.

27 Claims, 5 Drawing Sheets

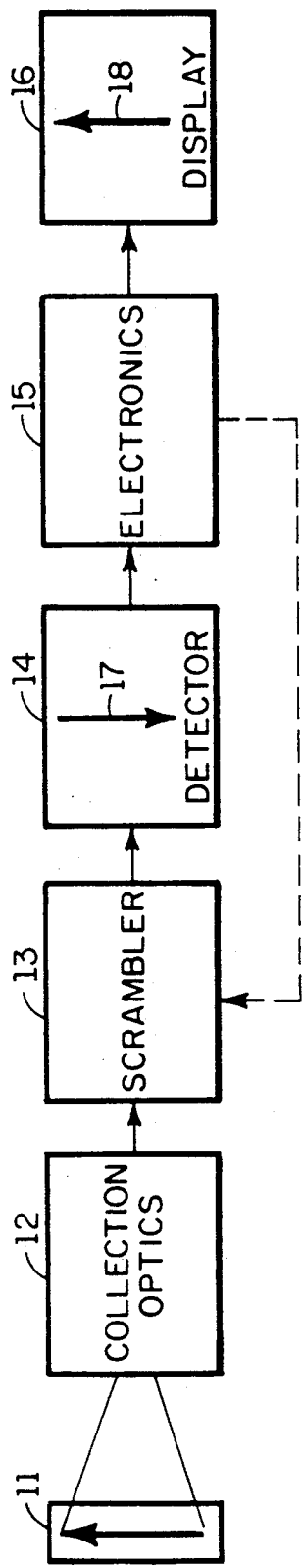
FIG. 1
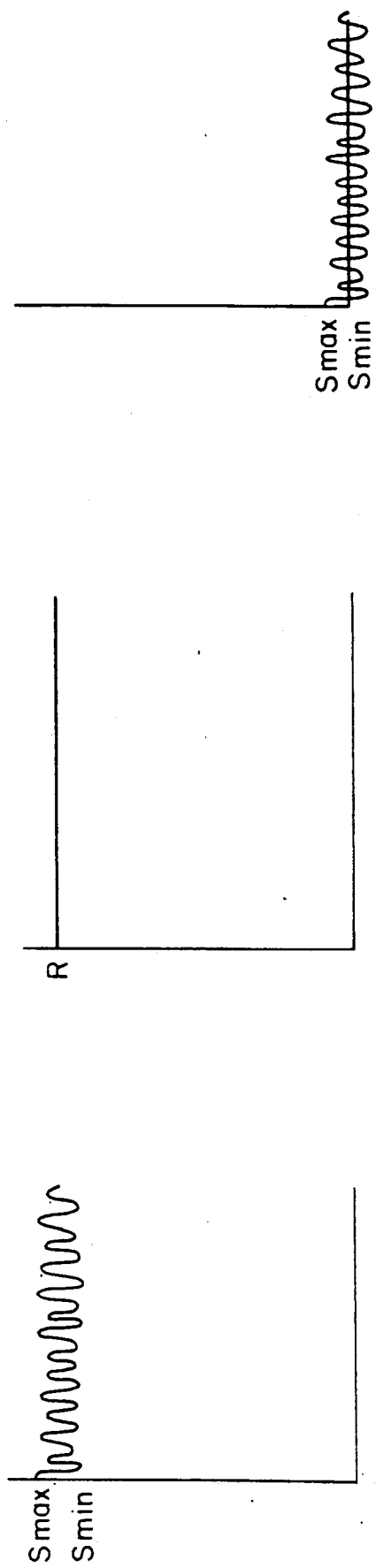
FIG. 3a
FIG. 3b
FIG. 3c

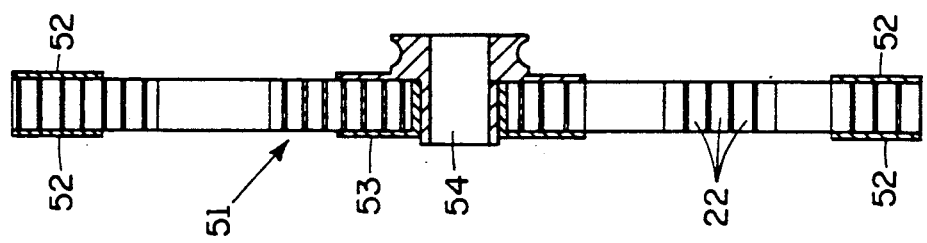
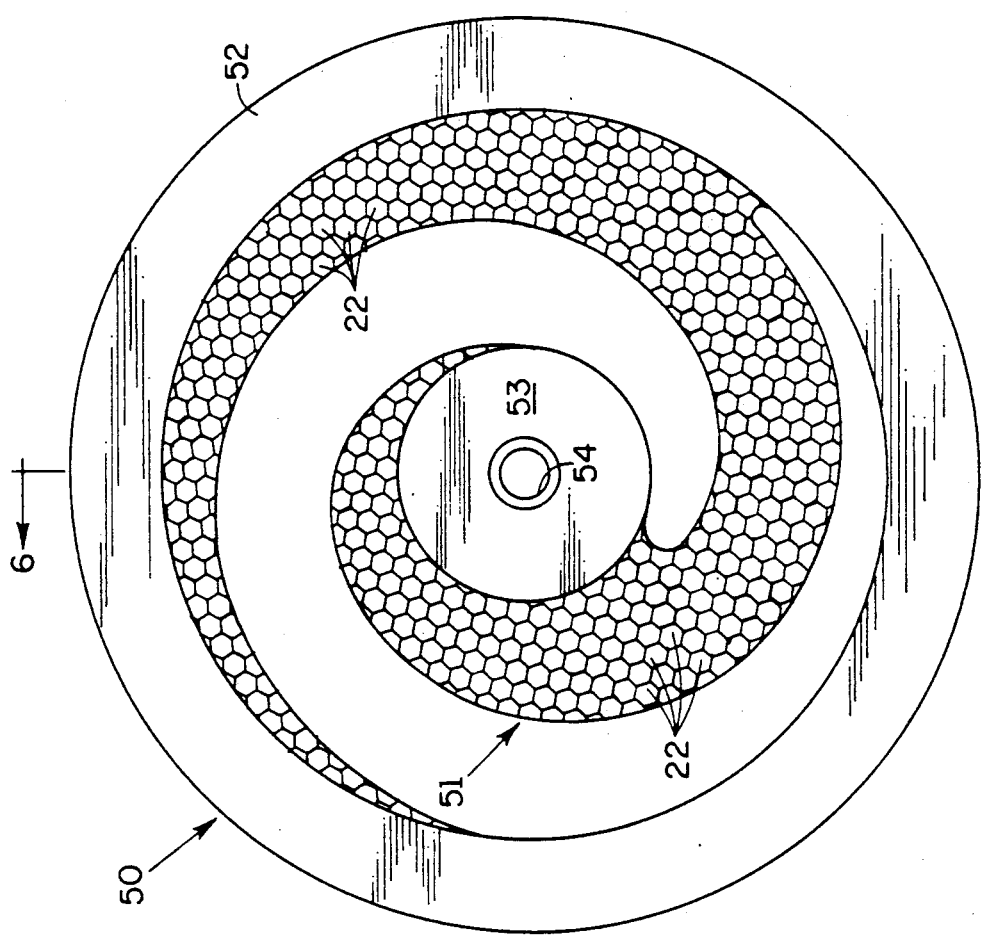

REFLECTIVE CHOPPER FOR INFRARED IMAGING SYSTEMS

This application is a continuation of application Ser. No. 07/387,456, filed 7/28/89, now abandoned.

TECHNICAL FIELD OF THE INVENTION

This invention relates generally to infrared imaging systems, and more particularly to obtaining a signal that represents radiance differences, not background radiance, of a viewed scene.

BACKGROUND OF THE INVENTION

Infrared imaging is the detection of infrared radiation to produce an image capable of being visualized by the human eye. Infrared imaging systems detect thermal radiance differences among objects in a scene, and display these differences as a visual image of the scene. Certain infrared radiation characteristics must be dealt with to obtain a satisfactory image. One such consideration is the background radiance from a scene, which is a large component of the total infrared radiation emitted by the scene. Radiance differences among the objects are small compared to this background radiance.

Infrared imaging systems, described at a broad level, include several basic components: optics for collecting and focusing infrared radiation from a source, an infrared detector for converting the radiance to an electrical signal, and electronics for amplifying and processing the signal for display or storage. These systems use a variety of infrared detectors, which can be grouped into two main categories: uncooled and cooled. Uncooled detectors include thermal detectors, whose temperature is changed by incident radiation. Cooled detectors include photoconductors, whose electrical conductivity is affected by incident radiation, or photovoltaic devices, which generate voltage as a result of incident radiation.

An infrared detector generates a signal in response to radiation emitted by a viewed scene. Either "staring" or scanning techniques may be used to produce the signal, but in either case, the signal has the same characteristics. The bias level of the signal represents the background radiation. The signal's modulation represents radiance differences, and is the part of the signal that differentiates objects within the scene. Yet, because of the large background radiance, the modulation is small compared to the signal's amplitude, making amplification difficult.

Accordingly, efforts have been made to isolate the modulated part of the signal. One approach is to determine a signal reference level, which is then subtracted from the overall signal to obtain a signal that contains only the modulation levels. One implementation of this approach is optical devices that artificially create a reference image An example of one such system uses thermal electric (PELTIER) coolers to produce an intermediate image, which then determines the reference. Another implementation uses a signal chopper to produce a defocused image, which represents the background radiance.

Disadvantages of these past efforts are the expense of cooling and defocusing components and the complication of the optics. The common problem has been to find an optimum way to produce a true reference signal that can be subtracted from the overall signal to produce a signal with minimum background bias.

SUMMARY OF THE INVENTION

One aspect of the invention is a method of producing an image of a viewed scene using an infrared imaging system. A biased signal is obtained by using an infrared detector in a normal manner to produce a signal that represents the radiances of objects in the scene. This signal has both a bias representing the background radiance and modulation representing the radiance differences. A reference signal is obtained by scrambling the infrared radiation before it reaches the infrared detector, and using the detector to measure the irradiance of this scattered radiation, which represents the background radiance of the scene. Then, the reference signal is subtracted from the biased signal to produce an unbiased signal representing radiance differences, which may be used to create a visual image.

Another aspect of the invention is an infrared imaging system that includes a special chopper. The chopper has an arrangement of reflective tubes and a means for moving the chopper in front of an infrared detector. When the chopper is placed in front of the detector, it causes an averaged uniform irradiance on the detector. This irradiance permits the detector to produce a reference signal representing the background radiance of the viewed scene, which can be subtracted from the signal representing the actual scene.

A technical advantage of the invention is that it produces a high quality image with an infrared imaging system. A reference signal representing unwanted background radiance is obtained from the viewed scene itself, and is close to a true average radiance. A further advantage of the invention is that it is inexpensive and eliminates the need for expensive cooling or defocusing devices. A still further advantage of the invention is that it may be used with numerous types of detectors, regardless of whether the detector is cooled or uncooled or scanned or staring.

DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

FIG. 1 is a block diagram of the components of an infrared imaging system in accordance with the present invention.

FIGS. 3a-3c illustrate signals representing biased, scattered, and unbiased signals respectively.

FIG. 5 is a front elevational view of a single spiral embodiment of the invention used to scatter radiation received by a detector by being rotated in a beam of radiation received by the detector.

FIG. 6 is a side elevational view of the embodiment of FIG. 5.

DETAILED DESCRIPTION OF THE INVENTION

Figure 2:
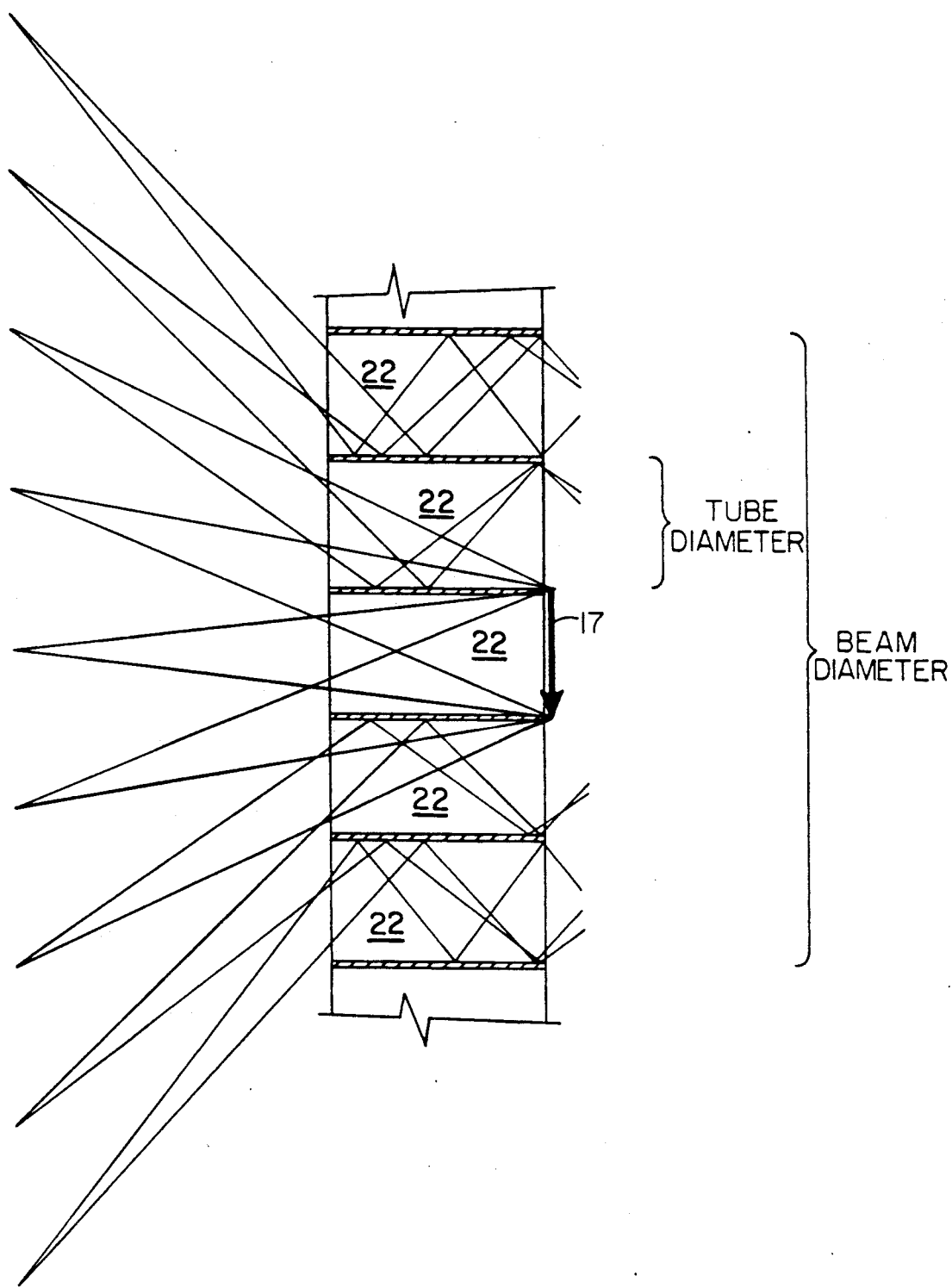
FIG. 2 illustrates the scrambling of radiation passing through an arrangement of tubes, such as may be used with the present invention.

FIG. 1 is a block diagram of an infrared imaging system in accordance with the present invention. In functional terms, infrared radiation from a source scene 11 is collected by optics 12. A chopper 13 is positionable between optics 12 and detector 14, and when so positioned, scatters the radiation before it reaches detector 14. Scattered or unscattered signals from detector 14 are delivered to electronics 15, where they are processed and delivered to display 16.

Source scene 11 may be any scene of objects that emit infrared radiation. As with all infrared imaging systems, the invention is especially useful when imaging by means of visual wavelengths is unavailable, such as in the dark or when vision is impaired by smoke, dust, or other particles. The invention is, of course, also useful during the day and when vision by means of the visual wavelengths is available.

Optics 12 is well known in the art of infrared imaging, and may be any one of a number of systems of lenses. The function of optics 12 is to produce a focused image on detector 14, so that detector 14 may detect the irradiance of the focused radiation it receives. The lenses are made of material that transmits infrared radiation such as germanium. The placement of optics 12 with respect to detector 14 is accomplished using well known principles of optics as applied to infrared imaging.

Chopper 13 is unique to the invention. The construction and the operation of chopper 13, as well as its placement with respect to detector 14, are explained in detail below.

Detector 14 may be any one of a wide variety of detectors. As explained above, an advantage of the invention is that it may be used with either cooled or uncooled detectors. Furthermore, the invention may be used with either "staring" or scanned detectors. The former type of detector is a large area detector onto which the entire image is focused at once and read out electronically. The latter type of detector uses a mirror or other means to sweep the signal across the detector one element at a time. Usually, although not necessary for the invention, both types of detectors consist of an array of detector elements, with the output of each element representing a portion of the viewed scene. For example, when a standard CRT display is used, the output of each detector element may represent a single pixel of the total image.

As explained below, whether the detector uses staring or scanning techniques may determine the position of the chopper 13 with respect to the detector. With a scanning detector, chopper 13 is placed in a "pupil position". With a staring detector, chopper 13 is placed near the image on detector 14.

Electronics 15 perform certain operations on the signals received from detector 14. The primary functions of electronics 15, such as receiving signals from detector 14 and amplifying a signal representing intensity changes, are well known in the art of infrared imaging. Electronics 15 may also be used to synchronize the motion of chopper 13, as explained below. Other features of electronics 15 particular to the use of chopper 13 are also described below.

Display 16 may be a special viewing device, such as a cathode ray tube. Depending on the type of display, an additional function of electronics 15 may be to transform the signals from detector 14 into a format for use with display 16. The image 18 displayed on display 16 is a visual image of the irradiance image 17 on detector 14 of the object 11.

Although not shown in FIG. 1, the infrared imaging system could be easily modified to permit digitization of the image signals so that the signals could be stored and processed as digital data. This merely requires sampling, storage, and processing devices, which are well known in the field of video and graphics processing.

Although there is more than one embodiment of the chopper of the present invention, the underlying concept of each embodiment is the same. This concept is that the signal generated by an infrared detector in response to focused radiation from a scene has a bias component, which represents background radiance, and which may be eliminated if an appropriate reference signal can be obtained and subtracted from the biased signal.

In accordance with this underlying concept, the method of the invention has these basic steps: measuring the radiation received from a scene with an infrared detector to generate a biased signal representing the radiance of objects in the scene; scrambling the radiation from the same scene; measuring the scattered radiation with an infrared detector to generate a reference signal; and subtracting the reference signal from the biased signal to produce an unbiased signal.

To implement this method, each embodiment of the invention includes an arrangement of reflective tubes, which scatter the radiation collected by optics 12 before it reaches detector 14. This scrambling is illustrated in FIG. 2, which is a cross sectional view of a representative embodiment of a chopper 13 made in accordance with the present invention. FIG. 2 is simplified in the sense that a chopper 13 having only five reflective tubes, each designated as 22, is shown. As will be explained below, practical embodiments of the invention include patterns of many tubes, each forming a passage, such as illustrated in FIG. 2.

The detector (not shown) used with the example of FIG. 2 is a staring type detector, which requires chopper 13 to be near the image 17 on the detector. However, the scattering shown in FIG. 2 is the same regardless of the placement of the chopper with respect to the detector. In either case, radiation representing an average radiance of the scene is produced on the output side of the chopper.

At the input side of chopper 13, radiation from optics 12 reaches chopper 13 and enters tubes 22, whose inner surfaces are reflective. Within chopper 13, each tube 22 either reflects or directly transmits the radiation entering the tube 22, in accordance with principles of reflection known in the field of optics. Radiation that is collimated or mostly collimated with respect to the tubes 22 passes undeviated, whereas less collimated radiation is reflected within the tubes 22. At the output side of chopper 13, the radiation is mostly scattered from what would otherwise be image 17. Only a small part of the radiation reaches detector 14 undeviated to form an image 17. However, the irradiance on detector 14 is the same as the average irradiance of the viewed scene if its radiation on detector 14 were not scattered. In other words, the detail of the scene is washed out, leaving a uniform average irradiance.

The ratio of radiation reflected away from detector 14 to the radiation received by detector 14 is a function of the relative size of the radiation beam entering chopper 13 and the aperture of each tube 22. By experimentation, it has been found that a satisfactory ratio is 4 to 1, with the tube aperture size being less than ¼ of the beam size. This permits 1/16 of the radiation to reach detector 14 undeviated, but permits the signal to be sufficiently scattered with a only a small loss of irradiance.

In addition to the diameter size of each tube 22, another consideration is the thickness of the walls of each tube 22. Because the walls block part of the radiation from the scene, the average irradiance is diminished as a function of the wall thickness. Thus, the walls are very thin relative to the diameter of each tube 22, and in the preferred embodiment are 1/1000 of an inch.

Another consideration is the length of each tube 22. The tubes should be of sufficient length to provide multiple reflections for extreme rays as indicated in FIG. 2. The multiple reflections reduce gross divergence of the beam, thus maintaining a high irradiance in the image plane.

In a more complicated system, appropriate adjustments could be made for aperture size and wall thickness, but this would require electronics 15 to include means for such calculations.

In the preferred embodiments, each tube 22 is adjacent to an adjoining tube 22. The perimeter of each tube 22 has a hexagonal shape. The overall pattern is that of a honeycomb. Other shapes, such as circular tubes, may also be used, with the design constraints including strength and reflectiveness.

Referring now to FIGS. 3a-3c, signals generated by detector 14 in response to both scattered and unscattered radiation from optics 12 are illustrated, as well as a signal representing the difference between them. FIG. 3a illustrates an unscattered signal, which represents the radiance of the actual scene. This signal has modulations in the range $S_{min}$ to $S_{max}$, and has a large component of background radiance. The modulations are small compared to the amplitude of the signal. The unscattered signal is therefore biased with this background component. FIG. 3b illustrates an ideal scattered signal. The amplitude of the signal at R represents the uniform average radiance level for that scene. FIG. 3c illustrates the signal that results when the signal of FIG. 3b is subtracted from the signal of FIG. 3a. This unbiased signal is suitable for amplification and processing.

In each embodiment of the invention, a signal resulting from scattered radiation is subtracted from a signal resulting from unscattered radiation. The various embodiments of the invention may be grouped into two main categories, according to the manner in which chopper 13 is moved across detector 14. One group of embodiments is moved in front of detector 14 so that it scatters the entire detector image 17 at once. The second group of embodiments is moved so that it scatters the image 17 line by line. The former embodiment, referred to as a frame chopper, may be any shape that will completely cover detector 14 when placed in front of detector 14. The second embodiment, referred to as a sequential chopper, has a preferred spiral shape that covers detector 14 line by line as the chopper rotates in front of detector 14. Both embodiments are further explained below.

The Frame Chopper

Figure 4:
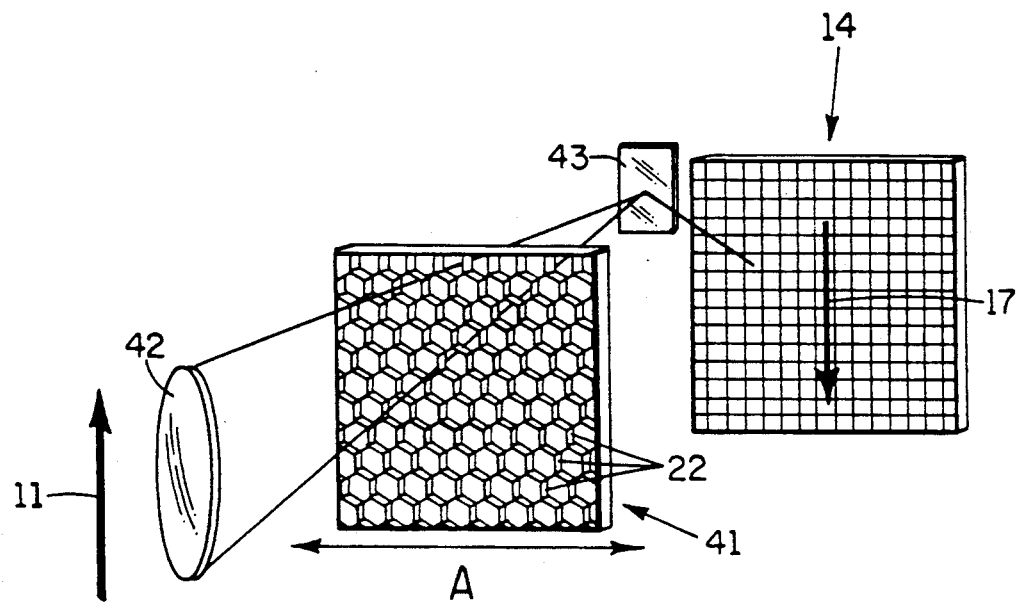
FIG. 4 illustrates part of an infrared imaging system, using a frame chopper and a scanning type detector in accordance with the invention.

A perspective view of a frame chopper 41, constructed in accordance with the present invention, and placed in the path of the radiation beam, between optics 12 and detector 14, is shown in FIG. 4. Detector 14 may be either a cooled or uncooled detector, and in FIG. 4, is a scanning type detector.

A beam of infrared radiation from a source scene 11 has been collected by an optics system such as optics 12 of FIG. 1. For purposes of simplicity, FIG. 4 shows only a single lens 42 used to focus the beam toward a mirror 43, which directs the beam to a point on detector 14. Mirror 43 is moved so that each element of detector 14 receives radiation from mirror 14 in a predetermined sequence, thereby constructing an image frame.

Chopper 41 is comprised of an arrangement of tubes 22 such illustrated in FIG. 2. In the preferred embodiment, tubes 22 are adjacent and form a honeycomb pattern. The inner surface of each tube 22 is reflective to infrared radiation, with materials such as copper or aluminum being particularly suitable. The size and length of each tube 22 are selected in accordance with the considerations discussed above in connection with FIG. 2.

As indicated by the direction arrow A in FIG. 4, chopper 41 is moveable back and forth across the beam radiating from source scene 11. Although not shown in FIG. 4, the means for accomplishing this motion may be any one of many possible means. For example, chopper 41 could be placed on a track and the back and forth motion of chopper 41 could be achieved with intermittent magnetic forces at one side.

To use the embodiment of FIG. 4, detector 14 is used to detect radiation from the source scene 11 for a frame of detector 14, with chopper 41 removed from the beam. Detector 14 generates a signal representing the radiance of objects within the viewed scene, such as the signal shown in FIG. 3a. As explained above, this signal is biased by the background radiance. This biased signal is digitized and stored.

After a biased signal has been obtained, chopper 41 is moved in front of detector 14, such that the beam of radiation from source scene 11 falls upon the input side of chopper 41. Chopper 41 is moved in front of detector 14 and mirror 43 in a "pupil position" with respect to the beam from optics 12. This means that chopper 41 is placed at a point where the beam is both intensified by optics 12 and noncollimated. As illustrated in FIG. 2, this causes a scattering of the radiation. Detector 14 generates a reference signal, such as the signal illustrated in FIG. 3b, which represents the uniform average radiance of the scene. This reference signal is also digitized and stored.

Using electronics 15, the reference signal is subtracted from the biased signal. This results in an unbiased signal, such as the signal illustrated in FIG. 3c, which may be amplified and used for display.

If a continuous image is desired, chopper 41 may be moved continuously back and forth so that unscattered and scattered signals of frames are received intermittently by detector 14. Electronics 15 may be easily modified to include a means for controlling the motion of chopper 41 and for synchronizing its motion with detector 14 so that electronics 15 will be able to differentiate scattered from unscattered signals.

The back and forth motion of chopper 41 is not a design limitation, and various other types of motion of chopper 41 are possible. Furthermore, the desired motion of chopper 41 could affect its shape For example chopper 41 could be in the shape of a cylinder surrounding detector 14 and rotated around it. If part of the cylinder were comprised of a tube array similar to that shown in FIG. 4 and part were open space, the same covering and uncovering of detector 14 accomplished with the embodiment shown in FIG. 4 could be easily achieved.

The frame chopper 41 could also be used with a staring type detector. The primary modifications to the configuration shown in FIG. 4 would be placing chopper 41 immediately in front of detector 14 so that the scattered radiation falls on detector 14. This positioning of chopper 41 with respect to detector 13 is explained below, in connection with the sequential chopper embodiment of the invention.

The Sequential Chopper

A front elevational view of another embodiment of a chopper constructed in accordance with the present invention is shown in FIG. 5. The chopper is generally designated as 50 and has three main components: tube array 51, support ring 52, and hub 53.

Tube array 51 consists of a number of tubes 22, arranged adjacent to each other to form a spiral shape. The size and length of each tube 22 are selected in accordance with the considerations discussed above in connection with FIG. 2.

Tube array 51 is made from a reflective material, such as aluminum or cooper, so that, as explained above in connection with FIG. 2, infrared radiation will reflect from the inside surfaces of each tube 22. In the preferred embodiment, tubes 22 are a honeycomb shape.

In the preferred embodiment, the spiral of tube array 51 is an archimedean spiral. The spiral shape permits a detector such as detector 14 to be placed behind chopper 50 so that when chopper 50 is rotated, detector 14 is covered at a leading edge of the spiral and subsequently uncovered at a trailing edge of the spiral. As a result of this motion, the portion of detector 14 that was first covered is the first portion to be uncovered. This covering and uncovering of detector 14 repeats continuously as chopper 50 is rotated.

If detector 14 is a detector array, the covering and uncovering occurs line by line from top to bottom. The curvature and size of tube array 51 is selected so that the "sag" of the leading edge of the spiral, as it moves downward across one line of detector 14 is sufficiently small so as to not interfere with the next line.

Support ring 52 is a circular ring, which gives chopper 50 a circular perimeter It also provides a surface for attaching a tube array 51. A sensor (not shown) could be placed on support ring 52 for detecting the position of chopper 50. This permits synchronization of the signals from detector 14 so that the appropriate signal subtraction can be performed.

At the midpoint of chopper 50 is a hub 53, which has a bore 54, which serves as a means for attaching a shaft so that chopper 50 can be rotated. A belt 75 attached to the shaft and to a motor mount of a motor 74, shown in FIG. 7, causes the rotation.

FIG. 6 is a side elevational view of chopper 50. As shown, chopper 50 is relatively thin. The thickness is primarily a function of the tube length, which is discussed above in connection with FIG. 2.

Figure 7:
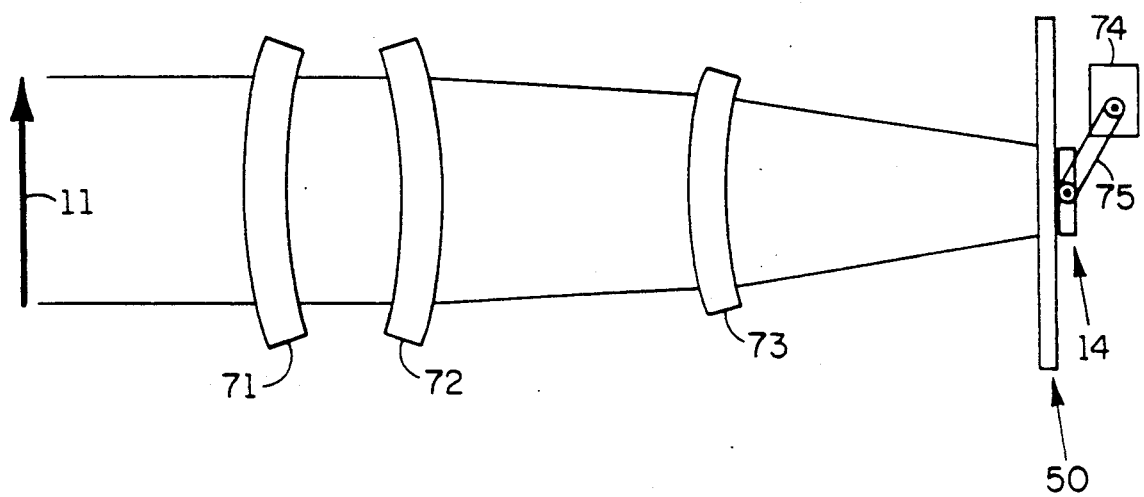
FIG. 7 illustrates part of an infrared imaging system, using a sequential chopper and a staring type detector in accordance with the invention.

Referring to FIG. 7, to use the invention, chopper 50 is incorporated into an infrared imaging system like the system of FIG. 1. The detector of FIG. 7 is a staring type detector and is placed in the same position with respect to optics 12 as it would be for standard use. Optics 12 consists of a positive lens 71, a negative lens 72, and a second positive lens 73, which focus the image on detector 14.

Chopper 50 is placed immediately in front of detector 14. Placing chopper 50 near the image on detector 14 prevents energy from being deviated away from detector 14, which would result in a loss of average irradiance. In the preferred embodiment, the distance between chopper 50 and detector 14 is in the range of 30/1000 to 100/1000 of an inch.

Chopper 50 is positioned so that detector 14 is away from the center of the spiral of tube array 51 where the rotating spiral appears to travel across the detector. Its spiral shaped tube array 51 will cover and uncover detector 14 as chopper 50 is rotated. Detector 14 has a width slightly wider than the widest portion of spiral pattern 51.

To produce an image, the same basic steps as described above are followed. The primary difference is that chopper 50 is rotated by means of motor 74 to cover detector 14 line by line, rather than frame by frame, as with the frame chopper 41. In the particular embodiment of FIG. 7, the line by line blocking of detector 14 is a sequential blocking of the beam of radiation to detector 14. An advantage of the sequential chopper is that there is no need to process signals representing an entire frame, as with the frame chopper described above. Only the signal from one line at a time need be processed. This is accomplished with well known devices included as part of electronics 15.

Figure 8:
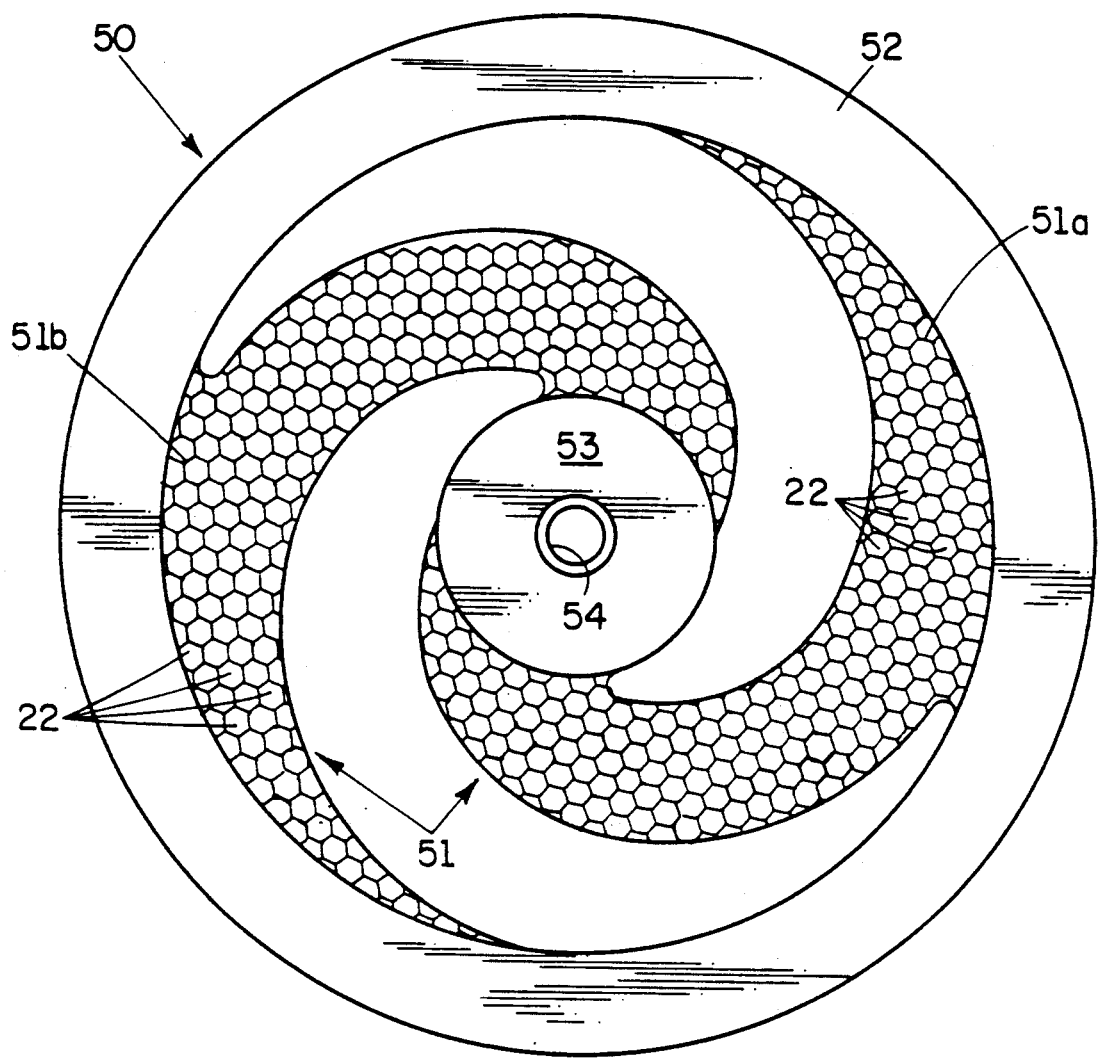
FIG. 8 is a front elevational view of a double spiral modification of the embodiment of FIG. 5.

FIG. 8 illustrates another version of the sequential chopper 50, which uses a double spiral for the tube array 51. This structure enhances the strength and balance of chopper 50.

Other configurations of sequential chopper 50 are possible, although rotating a spiral in front of detector 14 has been found to be an efficient means for covering detector 14 line by line, or for an equivalent effect, sequentially blocking the beam of radiation to detector 14. Nevertheless, any chopper shape, tube array shape, or means of moving the chopper could be used, so long as the leading edge of the tube array permits line by line covering of the detector or sequentially blocking of the beam. For example, a curved edge could be eccentrically rotated, or the tube array could have a teardrop shape. Nor is it necessary that chopper 50 be rotated. The same line by line covering of detector 14 could be accomplished with a back and forth or up and down motion, such as illustrated in FIG. 4. Finally, a cylinder such as described in FIG. 4 could be revolved around detector 14. Finally, although "line by line" in the above described embodiment refers to rows of a detector, this is not a definitional limitation and the same term could be used, and the same effect achieved, with columns.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

What is claimed is:

1. A method for producing an image of a scene, using an infrared imaging system, comprising the steps of:

detecting the actual infrared radiation from said scene to form a biased signal representing the radiances of objects within said scene;

scattering the infrared radiation emitted by said scene by placing an array of tubes having reflective inner surfaces across said actual radiation, such that rays of said radiation pass through said tubes at angles that are deviated from their normal path by said reflective inner surfaces;

detecting said scattered radiation to form a reference signal;

subtracting said reference signal from said biased signal to obtain an unbiased signal representing radiance differences emitted by said scene; and displaying an image generated in response to said unbiased signal.

2. The method of claim 1, wherein said scattering step causes a uniform average radiance of said scene to be irradiated upon an infrared detector.

3. The method of claim 1, wherein said scattering step further comprises arranging said tubes so that they are adjacent to each other and their axis is generally parallel to said rays.

4. The method of claim 1, wherein said scattering step comprises moving said array of tubes through sequential portions of a beam of radiation emitted by said scene.

5. The method of claim 1, wherein said scattering step comprises rotating a spiral shaped arrangement of said array of tubes across a beam of said radiation emitted by said scene.

6. The method of claim 5, wherein said rotating of said spiral comprises covering an infrared detector array line by line.

7. The method of claim 1, and further comprising the step of synchronizing said steps of producing signals.

8. A method for use in an infrared imaging system having an infrared detector, of generating a reference signal representing background radiance of a scene, comprising the steps of:

scattering the infrared radiation emitted by said scene by passing portions of said radiation in parallel through a number of passageways having reflective inner surfaces, such that rays of said radiation leave said passageways at angles that are deviated from their normal path, and the average radiance emitted by said scene is irradiated on said detector;

detecting said scattered radiation with said infrared detector; and generating a reference signal representing the uniform average radiance of said scene, using said scattered radiation.

9. The method of claim 8, wherein said scattering step further comprises arranging said passageways so that they are adjacent to each other and their axis is generally parallel to said rays.

10. The method of claim 8, wherein said detector has an array of receiving elements, and said scattering step comprises moving an arrangement of said passageways with respect to the receiving portion of said detector such that said radiation reaches said detector line by line of said detector.

11. The method of claim 8, wherein said scattering step comprises rotating a spiral shaped arrangement of said passageways of across a beam of said radiation emitted by said scene.

12. The method of claim 11, wherein said infrared detector has an array of receiving elements, and said rotating of said spiral shaped arrangement of passageways comprises covering said infrared detector array line by line.

13. An apparatus for producing an image of a scene, using an infrared imaging system, comprising:

optics for focusing radiation emitted by said scene on an infrared detector;

a chopper placed between said optics and an infrared detector, for scattering the infrared radiation emitted by said scene, wherein said chopper has an arrangement of tubes with reflective inner surfaces, the axis of each tube being placed generally parallel to the axis of said focused radiation;

a detector for detecting said scattered radiation, at a first time, to form a biased signal representing the radiance of objects in said scene, and at a second time, to form a reference signal in response to the output of said chopper;

electronics for receiving said signals and for subtracting said reference signal from said biased signal to obtain an unbiased signal representing radiance differences emitted by said scene; and a display for displaying an image generated in response to said unbiased signal.

14. The apparatus of claim 13, wherein said chopper produces radiation representing the average radiance, but not the radiance differences emitted by said scene.

15. The apparatus of claim 13, wherein said the tubes of said arrangement of tubes are closely adjacent such that the solid portions of the front of said chopper are minimized.

16. The apparatus of claim 15, wherein said arrangement of tubes comprises a honeycomb pattern of adjacent tubes.

17. The apparatus of claim 13, wherein said arrangement of tubes forms a single spiral shape.

18. The apparatus of claim 13, wherein said arrangement of tubes forms a double spiral shape.

19. The apparatus of claim 13, and further comprising a means for synchronizing the motion of said arrangement of tubes with said electronics.

20. A chopper for use with an infrared imaging system having an infrared detector, comprising:

an arrangement of passageways generally parallel to each other, each having an inner surface that is reflective to infrared radiation; and an actuating device for moving said arrangement of tubes in front of said infrared detector, such that the axis of said tubes is generally perpendicular to the receiving face of said detector.

21. The apparatus of claim 20, wherein said passageways have a honeycomb relationship to each other.

22. The apparatus of claim 20, wherein said arrangement of passageways has a leading edge and said actuating device moves said arrangement of passageways with respect to said detector such that said detector is covered sequentially by said leading edge.

23. The apparatus of claim 22, wherein said leading edge is curved and said actuating device rotates said arrangement of passageways.

24. The apparatus of claim 20, wherein said arrangement of passageways has a spiral shape.

25. The apparatus of claim 20, wherein the diameter of each of said passageways is less than one fourth the diameter of a beam of radiation entering said arrangement of passageways.

26. A method of generating a reference signal for use with an infrared imaging system, comprising the steps of:

receiving infrared radiation emitted by a scene into an array of passageways;

reflecting said radiation from the inner surfaces of said passageways as said radiation passes through said passageways; and permitting said reflected radiation to emerge from said passageways with substantially the same average intensity as upon entry to said passageways, but in a substantially unmodulated form.

27. The method of claim 26, wherein said receiving step comprises receiving said infrared radiation into a spiral shaped array of passageways, and further comprising the step of rotating said spiral shaped array of passageways.

* * * * *